Figures 1, 2:
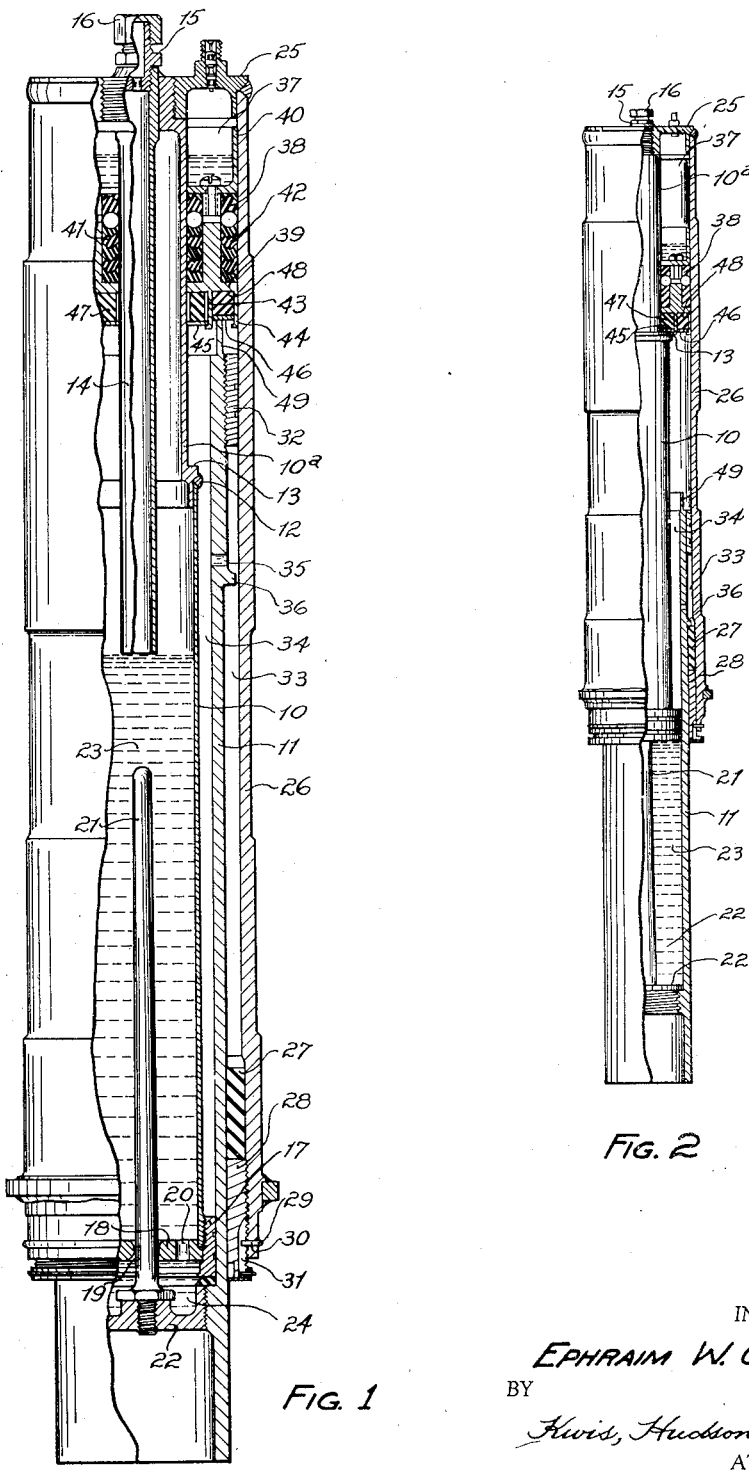

Sept. 26, 1939.    E. W. CLEVELAND    2,174,312
AIRPLANE STRUT
Filed Oct. 3, 1935

INVENTOR.
EPHRAIM W. CLEVELAND
BY
Kwis, Hudson & Kent
ATTORNEYS

Patented Sept. 26, 1939

2,174,312

UNITED STATES PATENT OFFICE 2,174,312

AIRPLANE STRUT

Ephraim W. Cleveland, Berea, Ohio, assignor to The Cleveland Pneumatic Tool Company, Cleveland, Ohio, a corporation of Ohio Application October 3, 1935, Serial No. 43,377

10 Claims. (Cl. 267—64)

This invention relates to improvements in airplane struts, and relates to a strut in which the shock of impact upon landing is taken first upon liquid, that is by flow through a metering opening, and then upon compressed air, the shocks of taxying being absorbed principally by compressed air.

One of the objects of the invention is to provide a construction of this character which shall be simple and compact, providing a strut of considerable length when the airplane is in flight and one of diminished length when it is on the ground.

Other objects and features of novelty will appear as I proceed with the description of that embodiment of the invention which, for the purposes of the present application, I have illustrated in the accompanying drawing, in which Fig. 1 is an elevational view, partly in central vertical section, of a strut embodying the invention, the parts being shown in fully compressed condition, and Fig. 2 is a similar view on a smaller scale with the strut fully extended, as it would be when the airplane was in flight and about to land.

The strut illustrated herein comprises a pair of telescoping cylinders 10 and 11 which are closed at or near their ends, and are adapted to be attached at their outer ends to the elements whose relative movements are to be cushioned, these elements in most cases being the wings or fuselage of an airplane on one hand and the running gear on the other. The cylinder 10 may include a portion 10a of reduced diameter at its upper end, the two portions being preferably connected by a weld 12. At the junction of these two parts there is an annular shoulder 13. A tube 14 arranged axially of the strut depends from the head of the inner cylinder, where it communicates with a hollow fitting 15 closed by a cap 16. When the strut is to be charged with oil or other liquid, the latter is introduced through fitting 15 and the tube 14. When the liquid being poured into the strut rises to the level of the bottom of tube 14 the escape of air through the tube is cut off, and hence the quantity of liquid which may be placed in the strut is accurately determined.

The lower end of cylinder 10 is threaded to receive a ring 17 which has a good sliding fit with the inner wall of cylinder 11. This ring also serves to clamp a partition plate 18 to the end of the cylinder 10. This plate is provided with a central metering opening 19, and in addition may have one or more smaller openings 20.

A metering pin 21 cooperates with the metering opening 19, being preferably tapered toward its upper end, and being threaded at its lower extremity for mounting in the head 22 of the cylinder 11. As will be apparent, the partition plate 18 divides the space surrounded by the two cylinders 10 and 11 into two compartments 23 and 24. On movements of compression from the extended position of the strut illustrated in Fig. 2 toward the position illustrated in Fig. 1, liquid from the lower compartment 24 is forced through the metering opening 19 and through the restricted opening or openings 20, if any of the latter are used, the restricted passages through the partition delaying the flow of liquid sufficiently to prevent a heavy shock to the airplane. Liquid metering apparatus of this kind and for this purpose is well known in the art.

On the threaded upper end of the cylinder section 10a there is mounted an auxiliary annular head 25, to which is welded a third cylinder 26 that surrounds the telescoping cylinders 10 and 11 and extends downwardly substantially the same distance as cylinder 10. Near its lower end this cylinder is internally enlarged somewhat to receive a packing 27 and a packing gland nut or sleeve 28, these parts being of any suitable character, and the sleeve 28 being locked in adjusted position by appropriate means, such as a spring ring 29 with an inturned end 30 projecting into a slot 31 in the sleeve.

Near the upper end of the cylinder 11 there is an external ring 32 which has a close sliding fit on the wall of cylinder 26. This ring forms the upper closure for an annular chamber 33 between the cylinders 11 and 26, the packing 27 constituting the lower closure for the same. This annular chamber of course varies in size with the movements of the strut. It is in communication with an inner annular chamber 34 through one or more small ports 35 in the cylinder 11. The latter cylinder carries an annular shoulder 36 which limits the expansion of the strut by its engagement with the packing 27, as shown in Fig. 2.

Between the cylinder section 10a and the outer cylinder 26 there is an annular air chamber 37. In this chamber there is a floating annular piston 38 having an integral bottom ring 39 and a separable top ring 40, the latter being L-shaped in cross section so as to provide an oil receptacle. Between the rings 39 and 40 and on either side of the main portion of the piston are packings 41 and 42, by means of which the piston is sealed against the cylinder section 10a as well as against the cylinder 26. Annular flanges 43 and 44 extend downwardly from the ring 38 in order to retain floating rings 45 and 46 of metal, above which are positioned rings 47 and 48 of soft rubber.

On the upper extremity of cylinder 11 there is an annular extension 49 that is adapted to engage the ring 46 when the cylinder 11 is raised sufficiently, and by this means upward motion may be imparted to the annular piston 38. The rubber ring 48 forms a cushion which yields sufficiently to deaden noise and prevent damage to the parts when this engagement takes place suddenly. When the piston is forced downwardly by the compressed air in chamber 37, causing ring 45 to engage shoulder 13, the rubber ring 47 yields to cushion that engagement and reduce noise.

Fig. 2 represents the strut in fully extended position, with the floating piston 38 down against the shoulder 13. This is the position which the parts occupy when the airplane is in flight, except where some means is used for retracting the running gear in order to reduce wind resistance. In the latter case the cylinder 11 is drawn up to the position shown in Fig. 1 by any suitable connections, where it is held until the pilot is about to make a landing, when it is lowered to the position of Fig. 2.

When a landing is made the impact of the running gear on the ground forces the cylinder 11 upwardly relative to the other elements of the strut, the liquid in the chamber 24 then being metered through the constricted passages 19 and 20 into the chamber 23. The passage 19, due to the taper of pin 21, gradually decreases in size as the cylinder rises. This metering of liquid absorbs a considerable portion of the force of the impact. Sometime before the cylinder 11 reaches the top of its stroke the extension 49 on its upper end engages annular piston 38 and starts it upward against the compressed air in chamber 37. The air then assists the metering of liquid in cushioning the balance of the impact stroke. As the plane taxies over the ground, shocks are absorbed on the soft air cushion, assisted by the metering of liquid through the openings 19 and 20, while the rebound strokes are checked by the suction created beneath plate 10, this suction being relieved gradually by the metering of oil downwardly through the constricted openings in the plate.

Variations from the described structure may be employed. Accordingly I desire it to be understood that the scope of the invention is to be regarded as defined exclusively by the appended claims rather than by the foregoing description or the accompanying illustration.

Having thus described my invention, I claim:

1. In a shock absorbing strut, two relatively movable members adapted to be attached to the elements whose movements are to be cushioned, a compartment in each of said members with a partition separating the compartments, said partition having a liquid metering opening therethrough, a third compartment containing air under pressure, a piston in said third compartment, and means made effective by the latter portion of the compression stroke only for causing one of said members to engage and move said piston in its compartment for reducing the volume of said third compartment and correspondingly checking the compression of the strut.

2. In a shock absorbing strut, two telescoping cylinders closed at their outer ends, a partition dividing the space within the cylinders into two compartments, said partition having a liquid metering opening therethrough, a third cylinder surrounding one of said telescoping cylinders, an annular piston interposed between said third cylinder and said last named telescoping cylinder, said piston forming one wall of an air chamber, and means made effective by the latter portion of the compression stroke for moving said piston to reduce the volume of said air chamber.

3. In a shock absorbing strut for airplanes, means for metering liquid in opposition to the impact stroke on landing, comprising two telescoping cylinders having their inner ends communicating through a liquid metering opening, and secondary shock absorbing means comprising an annular air chamber surrounding one of said cylinders, an annular piston in said chamber, and means made effective only after the cylinders have been telescoped to a predetermined extent for causing the piston to respond to further relative movements of the cylinders.

4. In a shock absorbing strut for airplanes, means for metering liquid in opposition to the impact stroke on landing, comprising two telescoping cylinders with their inner ends communicating through a liquid metering opening, a secondary shock absorbing means comprising an air chamber concentrically arranged with respect to said cylinders, a piston floating in said chamber, the outer end of one of said cylinders having a projecting portion adapted to engage said piston only after the strut has been compressed to a predetermined extent.

5. In a shock absorbing strut for airplanes, means for metering liquid in opposition to the impact stroke on landing, comprising two telescoping cylinders with their inner ends communicating through a liquid metering opening, a secondary shock absorbing means comprising an annular air chamber surrounding the exposed portion of the inner cylinder, and an annular piston floating in said chamber, the outer one of said cylinders having an extension adapted to engage said piston only after the strut has been compressed to a predetermined extent.

6. An airplane shock absorbing strut comprising telescopic casings, a metering pin carried by one of the casings, an orificed piston carried by the other casing for cooperation with the pin, a compressed air chamber in one of the casings, and a piston movable in the air chamber for imposing pressure on air contained therein adapted to seat on the other casing only after the liquid has been metered.

7. An airplane shock absorbing strut comprising telescopic casings, a metering pin carried by one of the casings, an orificed piston carried by the other casing for cooperation with the pin, an annular piston adapted to seat on the rod of the piston when the strut is in extended position and to seat on the casing carrying the metering pin when the strut is in collapsed position, and a chamber forward of the annular piston adapted to contain air under pressure.

8. An airplane shock absorbing strut comprising telescopic casings, a metering pin carried by one of the casings, an inner casing having a shoulder intermediate its length, a piston on the inner casing having an orifice for cooperation with the pin, an annular piston reciprocable on the inner casing adapted to seat on the shoulder when the strut is extended and on the casing carrying the metering pin when the strut is collapsed, and a chamber forward of the annular piston adapted to contain air under pressure.

9. An airplane shock absorbing strut comprising telescopic casings closed at their outer ends, a metering pin carried by one of the casings, an inner casing carried by the other casing, a shoulder on the inner casing intermediate its length, a piston on the inner casing having an orifice for cooperation with the pin, an annular piston reciprocable between the inner casing and the outer casing adapted to seat on the shoulder when the strut is extended and on the casing carrying the metering pin when the strut is collapsed, and a chamber forward of the piston adapted to contain air under pressure.

10. An airplane shock absorbing strut comprising telescopic casings closed at their outer ends, a metering pin carried by one of the casings, an inner casing carried by the other casing, a shoulder on the inner casing, an orificed piston on the inner casing for cooperation with the pin, an annular piston reciprocable between the inner casing and the casing supporting the inner casing, an oil receptacle carried by the annular piston, said annular piston adapted to seat on the shoulder when the strut is extended and on the casing carrying the metering pin when the strut is collapsed, and a chamber forward of the annular piston adapted to contain air under pressure.

EPHRAIM W. CLEVELAND.